United States Patent

Patterson et al.

[15] 3,689,551

[45] Sept. 5, 1972

[54] ODOR FREE NON-CAKING CONDITIONED UREA COMPOSITION AND PROCESS OF PREPARING SAME

[72] Inventors: Paul Raymond Patterson, 189 Elberta Ave., Niagara Falls, Ontario; Darryl Diamond Fry, 632 Furlong Ave., Chippawa, Ontario, both of Canada; Irving Klothen, 215 Mount Lucas Road, Princeton, N.J. 08540

[22] Filed: Nov. 6, 1969

[21] Appl. No.: 874,691

Related U.S. Application Data

[63] Continuation-in-part of Ser. No. 724,637, April 26, 1968, abandoned.

[52] U.S. Cl. ..........................260/555 C, 117/100 A
[51] Int. Cl. ............................................C07c 127/00
[58] Field of Search....260/555 C; 71/1, 28; 117/134, 117/100 A

[56] References Cited

FOREIGN PATENTS OR APPLICATIONS 245,105    6/1960    Australia................260/555 C

*Primary Examiner*—Leon Zitver
*Assistant Examiner*—Michael W. Glynn
*Attorney*—Robert P. Raymond

[57] ABSTRACT

This invention relates to a novel, odor free, non-caking, conditioned urea composition and a method for the preparation thereof. More particularly, the present invention is concerned with the preparation of finely divided urea compositions in which the urea particles are treated with selected conditioners which prevent the evolution of free ammonia from the particles and accumulation of free ammonia in the area in which the particulate mass is stored and maintain said particulate mass in a non-caking condition for an extended period of time.

8 Claims, No Drawings

ODOR FREE NON-CAKING CONDITIONED UREA COMPOSITION AND PROCESS OF PREPARING SAME

CROSS REFERENCE TO RELATED APPLICATION

This is a continuation-in-part application of application Ser. No. 724,637, filed Apr. 26, 1968, in the names of the present inventors, now abandoned.

BACKGROUND OF THE INVENTION

Urea finds utility in many fields of industry including agriculture, where it may be employed in fertilizers and animal feeds; in the chemical industry for the manufacture of a variety of organic chemicals or as a stabilizer for certain explosives and in the plastics industry for manufacture of resins and plastics. It is not surprising, therefore, that a substantial effort has been made to improve the methods for the manufacture of urea and develop a product substantially free of problems in handling, storage and use.

Pioneers in the field of urea production early recognized that urea is subject to severe caking problems when exposed to moisture or moist atmospheric conditions and soon embarked upon programs to manufacture urea in structural forms thought to be less susceptible to caking. Through these programs such products as fertilizer prills, flakes, microprills, crystals and the like where developed. These products showed some resistance to agglomeration but did not alleviate the problem to any measurable degree and other protective measures were sought.

Among the more important methods proposed for alleviating this problem were, (1) the use of the moisture-proof bag for storage of the prepared materials and (2) treatment of the urea particles with surface-adductifying or surface-coating agents. With regard to the latter proposal, one of the most successful treatments yet available is disclosed by T. J. Malley et al. in Canadian Pat. No. 629,423. According to the patentees, particulate urea is treated with from about 0.02 to 8% by weight of a wide variety of conditioning agent. Such agents include fatty acids, fatty acid esters, fatty acid amides, fatty acid amines, fatty acid alcohols and mixtures of such agents, normal aliphatic hydrocarbons having from seven to 50 carbon atoms, alkyl substituted aliphatic hydrocarbons having from seven to 50 carbon atoms in the straight chain and mixtures of said hydrocarbons. Although such treatments have generally been found to be effective for preventing caking of particulate urea for 30 days or more, with many of the conditioners proposed for use by the patentees, it has been found that resistance of the treated mass to agglomeration begins to diminish after this period. Moreover, it has been found that the proposed treatments are relatively ineffective for preventing the evolution of free ammonia from the particles and free ammonia accumulation in the area in which product is stored.

Like the process of Malley et al., it has also been found that the use of the so-called "moisture-proof bag" is not a cure-all for the problems encountered in the handling and storing of urea. This measure is not effective for preventing the evolution and accumulation of free ammonia and may, in fact, accentuate the problem. It was surprising, therefore, to discover that a particulate urea product could be manufactured which is extremely resistant to caking problems for a protracted period and is not subject to the evolution and accumulation of free ammonia.

SUMMARY OF THE INVENTION

The present invention relates to novel, odor free, non-caking, conditioned urea compositions comprising:

1. at least about 95 percent by weight of finely divided urea;
2. from about 0.1 percent to 1.0 percent by weight of methyl ester selected from the group consisting of crude cocoanut oil methyl esters, tallow fatty acid methyl esters having from about 12 to 18 carbon atoms, and the methyl esters of unsaturated fatty acids of a cis configuration containing from 18 to 22 carbon atoms and up to two double bonds; and
3. from about 0.01 to 0.5 percent by weight of a water soluble acidic salt selected from the group consisting of alkali metal and ammonium salts of polyvalent acids having at least one replaceable hydrogen ion. The expression "water soluble acidic salt," as used herein, is intended to mean that an aqueous solution of the alkali metal or ammonium salts, as described above, has a pH value below 7.0.

The compositions of the present invention can be prepared by treating at least about 95 percent by weight of finely divided urea such as urea prills, flakes, crystals, microprills or the like, with about 0.1 to 1.0 percent and preferably from about 0.25 to 0.75 percent by weight of a crude cocoanut oil methyl ester, tallow fatty acid methyl ester having from 12 to 18 carbon atoms and preferably 16 to 18 carbon atoms, or a methyl ester of an unsaturated fatty acid of cis configuration containing from 18 to 22 carbon atoms and up to two double bonds.

Generally, the ester is applied to an agitated bed of the particulate urea as a spray or aerosol. However, it may be applied in any convenient manner as by pouring the same into the agitated bed. Agitation is continued until the particles are essentially uniformly coated with the ester. The other conditioners may then be added to the agitated bed of urea or the ester coated urea may be stored until further treatment is desirable. In practice, it has been found that storage of the ester coated urea for from 12 hours to 5 days has no deleterious effects on the final product and may even improve its resistance to caking and the evolution and accumulation of free ammonia.

Typically the crude methyl ester of cocoanut oil is the residue from the methanol transesterified cocoanut oil from which the majority of $C_8$–$C_{14}$ esters have been fractionated but which will contain residual amounts of these short-chain esters as well as all $C_{16}$–$C_{20}$ esters and all still-bottom residues such as unsaponifiable matter, residual oil and glycerin, and may even be enriched with additional still-bottom residues from previous fractionations.

The crude tallow ester consists of the entire methanol transesterification product without any fractionation and may be enriched with further still-bottom residues from which $C_{16}$ and $C_{18}$ tallow esters have previously been fractionated.

The methyl esters of unsaturated $C_{18}$ to $C_{22}$ fatty acids of cis configuration containing up to two double bonds include such materials as methyl oleate ($C_{18}$—one double bond), methyl linoleate ($C_{18}$—two double bonds), methyl erucate ($C_{22}$), the methyl ester of tall oil, and the methyl ester of menhaden oil. These esters are either available commercially or can be readily prepared by transesterification procedures known to those skilled in the art. For example, the methyl ester of menhaden oil can be prepared by reacting methanol with crude menhaden oil using sodium methoxide as a catalyst. Product is recovered by vacuum distilling the reaction mixture to a maximum of 161°C. at 0.6 mm. of Hg.

Tall oil and menhaden oil methyl ester are composed of a mixture of fatty acid esters with the majority of the fatty acids being unsaturated $C_{18}$ to $C_{22}$ fatty acids. For example, a typical analysis of the methyl esters of tall oil and menhaden oil is shown below:

| | % Composition as saturated | | | % Composition as unsaturated | | |
|---|---|---|---|---|---|---|
| | $C_{14}$ | $C_{16}$ | $C_{18}$ | $C_{18}$, oleate | $C_{18}$, linoleate | Other* |
| Tall Oil Methyl Ester | - | 1 | 6 | 40 | 48 | 5 |
| Menhaden Oil Methyl Ester | 8 | 19 | 4 | 15 | 6 | 48 |

*primarily unsaturated $C_{20}$ and $C_{22}$

A review of the above table indicates that the Tall Oil methyl ester contains approximately 93 percent unsaturated $C_{18}$–$C_{22}$ acid, while the Menhaden Oil methyl ester contains approximately 69 percent unsaturated $C_{18}$–$C_{22}$ acid.

The preferred $C_{18}$–$C_{22}$ methyl esters are methyl oleate and methyl linoleate.

Attempts to successfully condition urea with saturated $C_{18}$ to $C_{22}$ fatty acids of a trans configuration and $C_{18}$ to $C_{22}$ fatty acids having unsaturation in excess of two double bonds have been unavailing.

Following the ester coating treatment, a sufficient amount of a water soluble acidic salt selected from the group consisting of alkali metal and ammonium salts of polyvalent acids having at least one replaceable hydrogen ion, is blended with the ester coated urea until essentially uniform distribution of the salt throughout the particulate mass is achieved. In practice it has been found that the amount of acidic salt required to give permanent protection against the evolution and accumulation of free ammonia is equal to that required to neutralize the free ammonia in the product plus one-half the ammonia present as ammonium slats, i.e., almost exclusively ammonium cyanate. Generally, from about 0.01 to 0.5 percent and preferably from about 0.05 to 0.2 percent by weight of said salt is sufficient for this purpose. Furthermore, it has been found preferable to apply such salt as a fine powder 100 percent of which is minus 100 microns.

In addition to the above treatment, it is generally desirable to blend from about 0.25 to 2.5 percent by weight of finely divided clay (95 percent of which is minus 10 microns), and preferably kaolin, with the product from the above treatment. Other materials such as talc or diatomaceous earth may be substituted for or blended with the clay, however, it is generally preferably to employ 95 percent −10 micron material and in an amount not exceeding about 2.5 percent by weight of total composition.

Although it is usually a preferred practice to add the water soluble salt to the methyl ester coated urea particles before blending with the desired amount of clay, we have found that the order of addition of the salt and clay is not critical to the production of an odor free, non-caking, conditioned urea product. The order of addition of these materials may be reversed or they may be blended together and admixed with the ester-coated urea particles as a uniform mix.

In order to more fully describe the present invention the following representative examples are presented which are not to be taken as limiting but merely as illustrative of the invention.

EXAMPLE 1

Accelerated Caking Test Procedure

Cylindrical test molds are made of perforated metal 1 ⅞inch dia. × 2 inches high. Perforations are one-sixteenth inch on 1/8 inch centers. The open top and bottom of the cylinder are closed with discs of polyethylene, next to the test sample and aluminum sheet, on the outside. A 50 gm. charge of the sample to be tested is put into the mold, and the mold is positioned under an air cylinder which exerts a force of 3 lb./sq. in. The whole assembly is held in a chamber, the temperature and relative humidity of which are varied as follows:

| 104°F. — 53% RH | 4 Hrs. |
| 68°F. — 81% RH | 2 Hrs. |

Total exposure time is 11½ complete cycles, starting and ending with the high temperature portion of the cycle. At the end of the exposure the molds are removed and cooled to room temperature in a desiccator. The top closure is then removed and the force is measured with a testing machine which is required to force a ¼ inch dia. rod, terminating in a 60° cone, into the cake. The results of experimental conditioners (at least 3 replicates per treatment) are presented below. In these tests the anti-caking properties of a conditioner or treatment are evaluated on the basis of low-crush strength and a high-caking index.

TABLE 1

Urea Microprills

| Conditioner | crush strength, Lb. | caking index |
|---|---|---|
| None | 69.1 | 1.0 |
| 3% kaolin | 32.6 | 2.1 |
| 0.25% Crude cocoanut oil methyl ester | 8.1 | 8.5 |
| 0.25% Crude cocoanut oil methyl ester + 2.7% kaolin | 7.2 | 9.6 |
| 0.375% Crude cocoanut oil methyl ester | 9.0 | 7.7 |
| 0.375% Crude cocoanut oil methyl ester + 2.6% kaolin | 4.6 | 15.0 |
| 0.50% Crude cocoanut oil methyl ester | 3.4 | 20.3 |
| 0.50% Crude cocoanut oil methyl ester + 2.5% kaolin | 3.2 | 21.6 |
| 0.75% Crude cocoanut oil methyl ester + 2.3% kaolin | 5.0 | 13.8 |
| 0.50% Crude cocoanut oil methyl ester + 2.5% kaolin + 0.05% sodium bisulfate | 9.9 | 7.0 |
| 0.50% methyl oleate ($C_{18}$) | 12.6 | 10.5 |
| 0.50% methyl linoleate ($C_{18}$) | 13.6 | 9.7 |
| 0.50% methyl erucate ($C_{22}$) | 7.9 | 20.6 |
| 0.50% methyl ester of tall oil ($C_{18}$–$C_{22}$) | 7.0 | 18.9 |

| 0.50% methyl ester of menhaden oil ($C_{16}$–$C_{22}$) | 8.9 | 15.0 |

Caking Index = Crush strength of untreated control/Crush strength of Sample

EXAMPLE 2

One thousand gram samples of feed-grade urea microprills, 93% – 20 mesh + 60 mesh, are treated with a variety of agents and/or conditioners to improve resistance thereof to agglomeration and prevent or inhibit development of free ammonia in the treated compositions. Test compositions are prepared by charging the prilled urea to a rotating drum, spraying the agitated bed of urea particles with the liquid anti-caking agent and thereafter introducing into said agitated bed an appropriate amount of solid anti-caking agent or solid anti-caking agent and conditioner to prevent accumulation of free ammonia in the treated samples. When solid conditioners are used alone in the treatment of urea prills, an appropriate amount of conditioner is simply blended with the urea for a sufficient period of time to assure uniform distribution of the conditioner in the sample. The thus prepared compositions are then placed in glass jars and sealed. At periodic intervals up to 9 days after preparation, each composition is examined for caking and the ammonia concentration in the confined air space over the samples is determined. The results obtained are reported below in Table 2.

Results obtained when other fatty acid methyl ester conditioning agents, such as methyl oleate, methyl linoleate, methyl erucate, the methyl esters of tall oil and menhaden oil, and tallow, were employed were substantially the same as those shown in Table 2 for crude cocoanut oil methyl ester.

EXAMPLE 3

To determine the effectiveness of various agents as anti-caking conditioners for urea, 500 to 1,000 lb. samples of feed-grade urea microprills, approximately 93 percent passing through a No. 20 and retained on a No. 60 U. S. standard sieve, are treated with a variety of agents in various combinations and concentrations. The agents tested are a crude methyl ester of palmitic and oleic acid derivatives from cocoanut oil, calcium stearate, kaolin and guar gum. The urea microprills are sprayed and/or blended in a conventional type mixer with the test agent or agents, then bagged in standard 80 lb. bags and stored. Test piles are made up by loading the experimental treatments on pallets and storing under a weight of 2 tons. Untreated urea microprills, bagged and stored in the same manner, are used as a control. At intervals of 1 and 3 months after treatment, bags from each treatment are opened, poured onto a ½ inch screen and the lumps, if any present, weighed. At such intervals bags from each treatment are also dropped 3 feet, then opened, poured onto a ½ inch screen and the lumps, if any present, weighed. The results obtained appear below in Tables 3 and 4, where it can be seen that urea prills treated with from about 0.37 to 0.75 percent by weight of crude cocoanut oil methyl ester and from about 0.24 to 2.46% by weight of kaolin markedly improved resistance thereof to agglomeration when bagged in conventional manner and stored under normal storage conditions. Replacement of the crude cocoanut oil methyl ester with other methyl esters such as methyl oleate, methyl linoleate, methyl erucate, and the methyl esters of tall oil, menhaden oil, and tallow produced substantially similar results to those shown for crude cocoanut oil methyl ester.

TABLE 2

| *Free ammonia in sample, p.p.m. | Additive(s) | Additive concentration, percent | [1] Ammonia concentration in confined air space over sample, p.p.m. | | | | | | Caking |
|---|---|---|---|---|---|---|---|---|---|
| | | | After 1 hr. | After 1 day | After 3 days | After 5 days | After 7 days | After 9 days | |
| 88 | None | | 2,000 | | 2,300 | | | | Hard set. |
| 129 | do | | 3,300 | 3,300 | | | | | Do. |
| 127 | do | | 4,700 | 5,000 | 3,800 | 3,800 | 3,800 | 3,400 | Do. |
| 175 | do | | 6,600 | 6,000 | 4,800 | 5,600 | 4,500 | 4,200 | Do. |
| 175 | Crude cocoanut oil methyl ester $C_{16}$-$C_{18}$, kaolin | 0.5, 2.5 | 2,100 | 2,300 | 2,000 | 1,900 | 1,700 | 1,500 | Non-caking. |
| 88 | Sodium bisulfate | 0.04 | 28 | | 1,500 | | | | Hard set. |
| 129 | do | 0.05 | <18 | | | 28 | | 282 | 338 | Do. |
| 127 | do | 0.06 | <18 | <18 | 84 | 450 | 850 | 900 | Do. |
| 175 | Crude cocoanut oil methyl ester $C_{16}$-$C_{18}$, kaolin, sodium bisulfate. | 0.5, 2.5 0.05 | <18 | 188 | 357 | | 357 | 460 | Non-caking. |
| 88 | Ammonium bisulfate | 0.03 | 28 | | 1,600 | | | | Hard set. |
| 129 | do | 0.05 | <18 | 28 | | 263 | 244 | | Do. |
| 127 | do | 0.06 | <18 | <18 | <18 | <18 | <18 | <18 | Do. |
| 88 | Monoammonium phosphate | 0.03 | 1,400 | | 1,200 | | | | Do. |
| 129 | do | 0.05 | 1,300 | 900 | <18 | | <18 | <18 | Do. |
| 100 | do | 0.1 | | <18 | | | | | Do. |
| 129 | Tall oil | 0.05 | 1,900 | 1,900 | | | | | Do. |
| 127 | do | 0.5 | <18 | 282 | 1.2 | 206 | 178 | 225 | Do. |

[1] Limit of test 18 p.p.m.
*Titration to pH 8.3 with hydrochloric acid.

TABLE 3

| | | One month bag storage tests for coated urea microprills | | | |
|---|---|---|---|---|---|
| | | Weight of lumps in 80 lb. bag | | Hardness of lumps | |
| Treatment number | Conditioner | As is | After dropping | As is | After dropping |
| 1 | None | 80 | | Hard | |
| 2 | 0.39% crude cocoanut oil methyl ester | 28.2 | 5.7 | Medium-hard | Medium. |
| 3A | 0.38% crude cocoanut oil methyl ester, 0.25 calcium stearate | 80 | 0.5 | Medium-hard | Do. |
| 4 | 0.37 crude cocoanut oil methyl ester, 0.24% kaolin | 31.2 | 0 | Medium | Free flowing. |
| 5 | 0.37% crude cocoanut oil methyl ester, 2.41% kaolin | 0, 0 | | Completely free flowing | Completely free flowing. |
| 6 | 0.51% crude cocoanut oil methyl ester | :0.2 | 7.7 | Medium-hard | Medium-hard. |
| 7 | 0.51% crude cocoanut oil methyl ester, 0.26% kaolin | 20.2 | 2.7 | Medium | Medium. |
| 8 | 0.49% crude cocoanut oil methyl ester, 2.46% kaolin | 0, 0 | | Completely free flowing | Completely free flowing. |
| 9 | 0.75% crude cocoanut oil methyl ester, 0.25% kaolin | 21.8 | 0 | Medium | Free flowing. |
| 10 | 0.75% crude cocoanut oil methyl ester, 2.28% kaolin | 0, 0 | | Completely free flowing | Completely free flowing. |
| 11 | 0.26% calcium stearate, 0.26% guar gum | 28.2 | 2.2 | Medium | Medium. |
| 12 | Normal urea (kaolin coated) | 7.2 | 5.7 | do | Do. |

These data show that treatments 5, 8 and 10 produce a completely free flowing urea product, however, a strong ammonia odor prevailed in the storage area.

TABLE 4

Three month bag storage tests for coated urea microprills

| Treatment number | Conditioner | Weight of lumps in 80 lb. bag As is | Weight of lumps in 80 lb. bag After dropping | Hardness of lumps As is | Hardness of lumps After dropping |
|---|---|---|---|---|---|
| 1 | None | 80.0 | 26.5 | Very hard | Very hard. |
| 2 | 0.39% crude cocoanut oil methyl ester | 28.5 | 0.5 | Hard | Medium. |
| 3A | 0.38% crude cocoanut oil methyl ester, 0.25% calcium stearate | 31.5 | 0.5 | Medium-hard | Medium-soft. |
| 4 | 0.37% crude cocoanut oil methyl ester, 0.24% kaolin | 17.5 | 1.5 | Medium-hard | Do. |
| 5 | 0.37% crude cocoanut oil methyl ester, 2.41% kaolin | 5.0 | 0 | Soft | Free flowing. |
| 6 | 0.51% crude cocoanut oil methyl ester | 12.5 | 0.5 | Medium | Medium |
| 7 | 0.51% crude cocoanut oil methyl ester, 0.26% kaolin | 5.5 | 0 | Medium-soft | Free flowing. |
| 8 | 0.49% crude cocoanut oil methyl ester, 2.46% kaolin | 2.5 | 0 | Soft | Do. |
| 9 | 0.75% crude cocoanut oil methyl ester, 0.25% kaolin | 14.0 | 0.5 | Medium | Medium-soft. |
| 10 | 0.75% crude cocoanut oil methyl ester, 2.28% kaolin | 4.5 | 0 | Medium-soft | Free flowing. |
| 11 | 0.26% calcium stearate, 0.26% guar gum | 39.0 | 4.5 | Medium-hard | Hard. |
| 12 | Normal urea (kaolin coated) | 24.0 | 3.0 | do | Medium-soft. |

EXAMPLE 4

500 to 1,000 pound samples of feed-grade urea microprills, 93% −20 mesh +60 mesh, are charged to a conventional type blender and sprayed with approximately 0.5 percent by weight of crude cocoanut oil methyl ester having from 16–18 carbon atoms and marketed under the trademark Stepan C-65. Blending is continued until substantially uniform coating is achieved. 2.5 percent by weight of finely divided kaolin and from 0.02 to 0.22 percent by weight of sodium bisulfate (100% −100 microns) is then charged to the agitated bed of coated urea and thoroughly blended therewith. The thus prepared product is bagged in standard 80 pound bags and stored in conventional storage facilities. Each composition is examined daily for seven days and the concentration of ammonia in the confined air space over the samples determined. Data obtained are reported below.

To determine the amount of ammonium salts in the original samples as ppm. $NH_3$ the ammonium salts are converted to the acids of the salts with formaldehyde and measured by an acid-base titration.

EXAMPLE 6

Ten tons of prilled urea (8–14 mesh) are sprayed with crude cocoanut methyl ester at a rate of 0.5 percent by weight of urea while being conveyed from the prilling tower to the storage shed. The conveying equipment serves to blend the methyl ester and urea so that the prills discharged in the shed are uniformly coated and are ready for further mixing with 0.1 percent sodium acid sulfate and 0.5 percent kaolin to yield a final product for bagging and storage. The thus prepared product is found to be non-caking and odor free.

We claim:

1. An odor free, non-caking, conditioned urea composition comprising:
   1. at least about 95 percent by weight of finely divided urea;
   2. from about 0.1 to 1.0 percent by weight of a methyl ester selected from the group consisting of
      i. crude cocoanut oil methyl esters and tallow fatty acid methyl esters having from 12 to 18 carbon atoms; and

TABLE 5

[Tests showing ammonia concentration above treated product related to free ammonia and ammonium salts in original product]

| Sample | Free ammonia in original sample (p.p.m.) | Ammonium salts in original sample as p.p.m. $NH_3$ | Additives (percent) Clay | Additives (percent) Methyl ester [1] | Additives (percent) NaHSO₄ [2] | Concentration of ammonia (p.p.m.) that sodium bisulfate will neutralize | Ammonia concentration in confined air space over sample, at 70° F., p.p.m. After 1 day | After 2 days | After 3 days | After 4 days | After 5 days | After 6 days | After 7 days |
|---|---|---|---|---|---|---|---|---|---|---|---|---|---|
| 1 | 100 | 272 | 2.5 | 0.5 | | | 9,800 | 9,800 | | | 6,500 | | |
| 2* | 100 | 272 | 2.5 | 0.5 | 0.1 | 130 | 1,300 | 2,200 | | | 2,100 | | |
| 3 | 100 | 272 | 2.5 | 0.5 | 0.12 | 156 | 200 | 1,000 | | | 1,100 | | |
| 4 | 22 | 528 | 2.5 | 0.5 | 0.22 | 286 | <18 | <18 | <18 | <18 | <18 | <18 | <18 |
| 5 | 22 | 528 | 2.5 | 0.5 | 0.02 | 26 | 1,200 | 1,100 | | 1,100 | | | 1,000 |
| 6 | 22 | 218 | 2.5 | 0.5 | 0.10 | 130 | <18 | <18 | <18 | <18 | <18 | <18 | <18 |
| 7** | 56 | 240 | 2.5 | 0.5 | 0.20 | 260 | <18 | <18 | <18 | <18 | <18 | <18 | <18 |
| 8*** | 60 | 204 | 2.5 | 0.5 | 0.15 | 195 | 18 | 18 | 18 | | | | |

*Sample 2 breakthrough of ammonia occurred after 6 days.
**Sample 7 no breakthrough of ammonia detected after 10 days.
***Sample 8 no breakthrough of ammonia detected after 17 days.
[1] Crude cocoanut oil methyl ester.
[2] Sodium bisulfate.
All samples completely free flowing.

EXAMPLE 5

Fifty pounds of fresh urea crystals are placed in a cement mixer and sprayed with a fine mist of 170 g. crude cocoanut methyl ester and allowed to blend until uniformly coated. After about 30 minutes, the mixture becomes free-flowing. 22.7 g. of finely divided sodium acid sulfate are then added to the blending material. After three minutes the uniformly mixed materials are discharged and stored. The thus prepared product is found to be non-caking and odor free.

ii. methyl esters of unsaturated fatty acids of a cis configuration containing from 18 to 22 carbon atoms and up to two double bonds; and
   3. from about 0.01 to 0.5 percent by weight of a water soluble acid salt selected from the group consisting of sodium bisulfate, ammonium bisulfate, and monoammonium phosphate.

2. A composition according to claim 1 wherein said composition contains in addition to said methyl ester and acidic salt, from about 0.25 to 2.5 percent by weight of finely divided clay.

3. A composition according to claim 1 wherein said methyl ester is said cocoanut oil methyl ester and has from about 16 to 18 carbon atoms.

4. A composition according to claim 1 wherein said methyl ester is methyl oleate or methyl linoleate.

5. A composition according to claim 1 wherein said acid salt is sodium bisulfate and said methyl ester is said cocoanut oil methyl ester, and is present in said composition in an amount from about 0.25 to 0.75 percent by weight of said composition.

6. An odor free, non-caking, conditioned urea according to claim 1 comprising: at least about 95 percent by weight of finely divided urea, from about 0.25 percent to about 0.75 percent by weight of a crude cocoanut oil methyl ester having from 16 to 18 carbon atoms, from about 0.05 to 0.2 percent by weight of an acidic salt selected from the group consisting of sodium bisulfate, ammonium bisulfate, and monoammonium phosphate and from about 0.25 to 2.5 percent by weight of finely divided kaolin.

7. A composition according to claim 1 wherein said acid salt is sodium bisulfate and said methyl ester is present in said composition in an amount from about 0.25 percent to 0.75 percent by weight of said composition.

8. An odor free, non-caking, conditioned urea according to claim 1 comprising: at least about 95 percent by weight of finely divided urea, from about 0.25 percent to about 0.75 percent by weight of a methyl ester selected from the group consisting of methyl oleate and methyl linoleate, from about 0.05 to 0.2 percent by weight of an acidic salt selected from the group consisting of sodium bisulfate, ammonium bisulfate and monoammonium phosphate and from about 0.25 to 2.5 percent by weight of finely divided kaolin.

* * * * *

UNITED STATES PATENT OFFICE
CERTIFICATE OF CORRECTION

Patent No. 3,689,551          Dated September 5, 1972

Inventor(s) Paul R. Patterson; Darryl D. Fry and Irving Klothen

It is certified that error appears in the above-identified patent and that said Letters Patent are hereby corrected as shown below:

Column 1, after the inventors addresses, insert

-- Assignors to American Cyanamid Company, Stamford, Conn.--

Signed and sealed this 3rd day of April 1973.

(SEAL)
Attest:

EDWARD M. FLETCHER, JR.
Attesting Officer

ROBERT GOTTSCHALK
Commissioner of Patents